(12) United States Patent
Trussell

(10) Patent No.: US 8,675,189 B2
(45) Date of Patent: Mar. 18, 2014

(54) SYSTEM AND METHOD FOR ESTIMATING PROJECTOR PRIMARY SPECTRA USING RGB MEASUREMENT

(75) Inventor: Joel Trussell, Durham, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 12/580,059

(22) Filed: Oct. 15, 2009

(65) Prior Publication Data

US 2011/0090504 A1 Apr. 21, 2011

(51) Int. Cl.
*G01J 3/00* (2006.01)
*G01J 3/40* (2006.01)
*G01N 21/25* (2006.01)

(52) U.S. Cl.
USPC ............ 356/300; 356/303; 356/416; 356/418

(58) Field of Classification Search
USPC ................. 356/416, 418, 300, 302, 303, 121, 356/319–325, 407, 413, 419
See application file for complete search history.

(56) References Cited

U.S. PATENT DOCUMENTS

| | | | |
|---|---|---|---|
| 5,543,940 A | | 8/1996 | Sherman |
| 6,417,892 B1 * | | 7/2002 | Sharp et al. ................... 348/742 |
| 6,987,567 B2 | | 1/2006 | Takahashi et al. |
| 7,113,315 B2 * | | 9/2006 | Frick et al. ..................... 358/518 |
| 7,370,992 B2 * | | 5/2008 | Cheng et al. .................. 362/293 |
| 7,375,715 B2 * | | 5/2008 | Hirakata ......................... 345/98 |
| 7,554,586 B1 | | 6/2009 | Imai et al. |
| 7,574,060 B2 | | 8/2009 | Gambhire |
| 2005/0171707 A1 * | | 8/2005 | Easley et al. .................... 702/40 |
| 2008/0218784 A1 * | | 9/2008 | Ben-Chorin et al. .......... 358/1.9 |
| 2009/0097030 A1 * | | 4/2009 | Ho et al. ....................... 356/418 |
| 2010/0149536 A1 * | | 6/2010 | Sato .............................. 356/419 |
| 2010/0182598 A1 * | | 7/2010 | Choi et al. .................... 356/323 |

OTHER PUBLICATIONS

Niranjan Damera-Venkata et al; Realizing Super-Resolution with Superimposed Projection; IEEE Int'l Worshop on Projector-Camera Systems Jun. 18, 2007.

* cited by examiner

*Primary Examiner* — Gregory J Toatley
*Assistant Examiner* — Willie Merrell, II

(57) ABSTRACT

A method for characterizing a primary radiant spectra of a projector includes projecting primary colors with a projector having a projector lamp and color filters. Measurements of each primary color are taken with a multi-band camera. Spectra of the color filters are estimated using the measurements from the multi-band camera. The primary radiant spectra of the projector are estimated using spectral data of the projector lamp and the estimated spectra of the color filters.

18 Claims, 7 Drawing Sheets

SYSTEM AND METHOD FOR ESTIMATING PROJECTOR PRIMARY SPECTRA USING RGB MEASUREMENT

BACKGROUND

Multiple projector systems have been developed to project multiple video images to a common display location, such as a screen or wall, to produce a composite display. A composite display is one in which a single image is produced using multiple projectors, with each projector producing a portion or component of the total image. These display systems can be configured to allow multiple sub-frames to overlap completely, not at all, or anything in between, or to provide multiple separate composite images.

One challenge associated with composite images is consistent reproduction of color hue across multiple displays or multiple channels on the same display. For example, color spectra can vary within each individual projector of a composite display system, with the result that the composite image has noticeable irregularities. Knowing the current color properties of each projector is desirable to determine the transformation from a standard color space, such as sRGB, to the device RGB space of the projector, which is used in the calibration of the multiple projector system.

Measurement of primary radiant spectra of each projector has been accomplished using radiographic measurement with an expensive, high-precision instrument such as a spectroradiometer. However, it is often not practical to make high-precision radiographic measurements during the time-constrained setup of a multiple projector display system.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
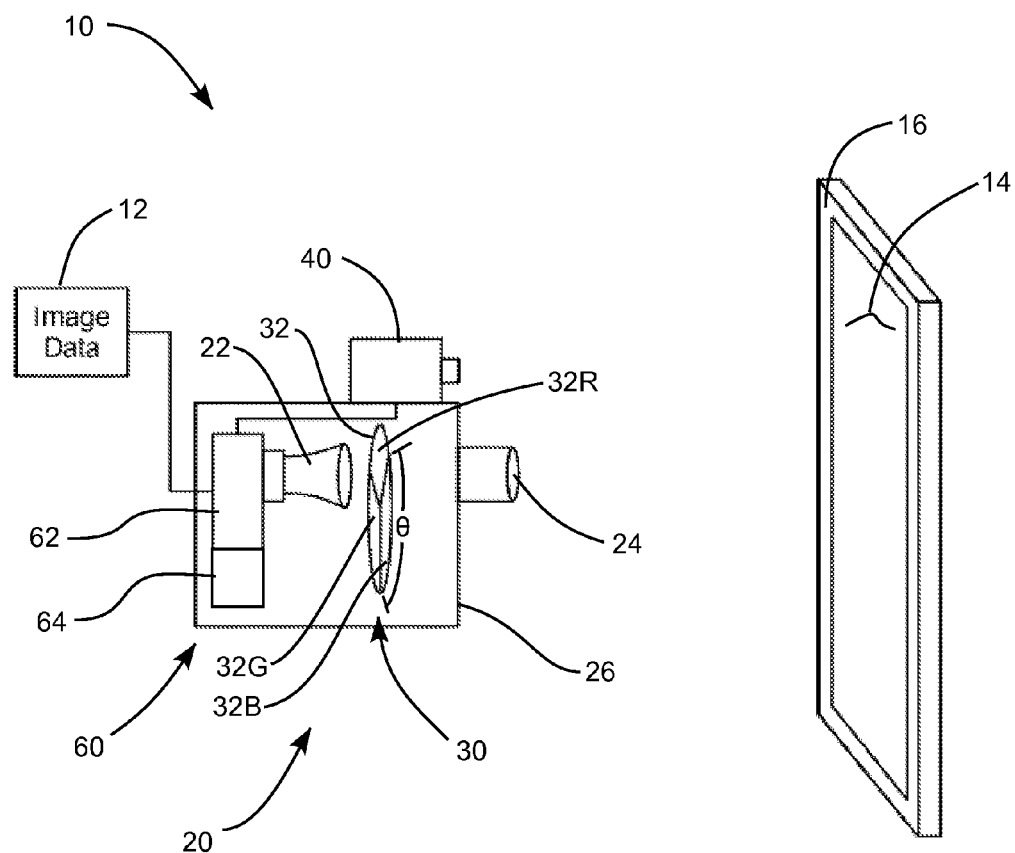
FIG. 1 is a block diagram of an embodiment of a projector system configured to characterize the primary radiant spectra of the projector.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc., are used with reference to the orientation of the figures being described. Because components of various embodiments disclosed herein can be positioned in a number of different orientations, the directional terminology is used for illustrative purposes only, and is not intended to be limiting.

As used herein, the terms "computer" and "microprocessor" refer to any type of computing device, including a personal computer, mainframe computer, portable computer, PDA, smart phone, or workstation computer that includes a processing unit, a system memory, and a system bus that couples the processing unit to the various components of the computer. The processing unit can include one or more processors, each of which may be in the form of any one of various commercially available processors. Generally, each processor receives instructions and data from a read-only memory (ROM) and/or a random access memory (RAM). The system memory typically includes ROM that stores a basic input/output system (BIOS) that contains start-up routines for the computer, and RAM for storing computer program instructions and data.

A computer typically also includes input devices for user interaction (e.g., entering commands or data, receiving or viewing results), such as a keyboard, a pointing device (e.g. a computer mouse), microphone, camera, or any other means of input known to be used with a computing device. The computer can also include output devices such as a monitor or display, projector, printer, audio speakers, or any other device known to be controllable by a computing device. In some embodiments, the computer can also include one or more graphics cards, each of which is capable of driving one or more display outputs that are synchronized to an internal or external clock source.

The term "computer program" is used herein to refer to machine-readable instructions, stored on tangible computer-readable storage media, for causing a computing device including a processor and system memory to perform a series of process steps that transform data and/or produce tangible results, such as a display indication or printed indicia.

The terms "computer-readable media" and "computer-readable storage media" as used herein includes any kind of memory or memory device, whether volatile or non-volatile, such as floppy disks, hard disks, CD-ROMs, flash memory, read-only memory, and random access memory, that is suitable to provide non-volatile or persistent storage for data, data structures and machine-executable instructions. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and optical disks, such as CD, CDROM, DVD-ROM, DVD-RAM, and DVD-RW. Any of the above types of computer-readable media or related devices can be associated with or included as part of a computer, and connected to the system bus by respective interfaces. Other computer-readable storage devices (e.g., magnetic tape drives, flash memory devices, and digital video disks) also may be used with the computer.

As used herein the term "a priori information" refers to information relating to or derived by reasoning from self-evident facts, or information presupposed based on experience. For example, a red color filter in a projector can be assumed to have greatest transmission (magnitude) in the red wavelengths of the color spectrum, which is in the 550 to 750 nanometer wavelength region. Other examples of a priori information may include information about filters shapes of primary color filters, wavelengths or color of the filter, and the like.

As used herein the term "primary color" refers to a primary color of the color spectrum of a projector system. For example, an RGB projector system can have three primary colors, namely red, green or blue. Additionally, the term "RGB" refers to the three primary colors red, green, and blue in the RGB projector system.

For convenience, the features and principles illustrated herein are described with respect to an RGB projector system. However, it will be appreciated that the features, principles and concepts can be applied to any multi-band primary projector system with other primary color schemes, including red-green-blue-white (RGBW) systems, cyan-magenta-yellow (CMY) projectors, cyan-magenta-yellow-green (CMYG) projectors, or RGB-CMY combination projector systems, and the like.

As used herein the term "convex set" refers to sets in Euclidean space where, for every pair of points within the set, every point on the straight line segment that joins the pair of points is also within the set. Stated mathematically, if C is a set in a real or complex vector space, then C is said to be convex if, for all x and y in C and all t in the interval [0,1], the point ((1−t) x+t y) is in the set C. Thus, every point on the line segment connecting x and y is in the set C. For example, a square or solid cube is convex, but anything that is hollow or has a concave curvature, such as a crescent shape, is not convex.

The exemplary embodiments described herein generally provide a system and method for estimating the radiant spectra of a projector system. The projector system includes a lamp and color filters. The radiant spectra of the projector system are defined by the product of the lamp spectra and the filter spectra. The spectrum of the lamp is generally known. The spectra of the filters are unknown. However, the spectra of the filters can be estimated by a combination of "a priori" information known about the filters and data gathered from primary colors displayed by the projector as recorded by a multi-band camera.

To accomplish the estimation of the primary radiant spectra of the projector, each pure primary color can be individually produced by the lamp projecting light through each primary color filter. The spectrum of each projected primary color can be measured by a multi-band primary color camera with a minimum of three bands covering the spectral range of 400-700 nm, such as an RGB camera, RGBW camera, CMY camera, CMYG camera, and the like. The camera can be focused on an image of the projected primary color to record the primary color as projected from the projector.

Convex constraint sets can then be defined based on the known values for the lamp spectra, the spectral sensitivities of the camera, the measurements for each primary color as recorded by the multi-band camera, and the a priori information about the color filters. The primary radiant spectra of the projector can then be determined by an iterative method for solving undetermined systems such as the Projection onto Convex Sets (POCS) iterative method using the previously defined convex constraint sets.

Illustrated in FIG. 1 is a block diagram of one embodiment of a system for characterizing primary radiant spectra of a projector, indicated generally at 10. The system 10 processes image data 12 and generates a corresponding displayed image 14. The displayed image 14 can include any pictorial, graphical, or textural characters, symbols, illustrations, or other representations of information. In one embodiment, the system can have a projector, indicated generally at 20, a multi-band camera, indicated generally at 40, and a microprocessor, indicated generally at 60.

The projector 20 can include a projector lamp 22, a plurality of color filters, indicated generally at 30, and a projection lens 24. The lamp and the color filters can be operated together to selectively display an image 14 consisting of an individual pure primary color such as pure red, pure green or pure blue, onto a projection surface 16.

The lamp 22 can be an ultra-high pressure (UHP) mercury lamp. Such UHP mercury lamps are widely used in projector applications and generally conform to industrial standards that yield reasonable consistency in spectral properties of the lamp regardless of brand of manufacture. For example, since mercury is the light source, the spectra of all mercury lamps will generally have the same shape across a desired spectral bandwidth.

Figure 2:
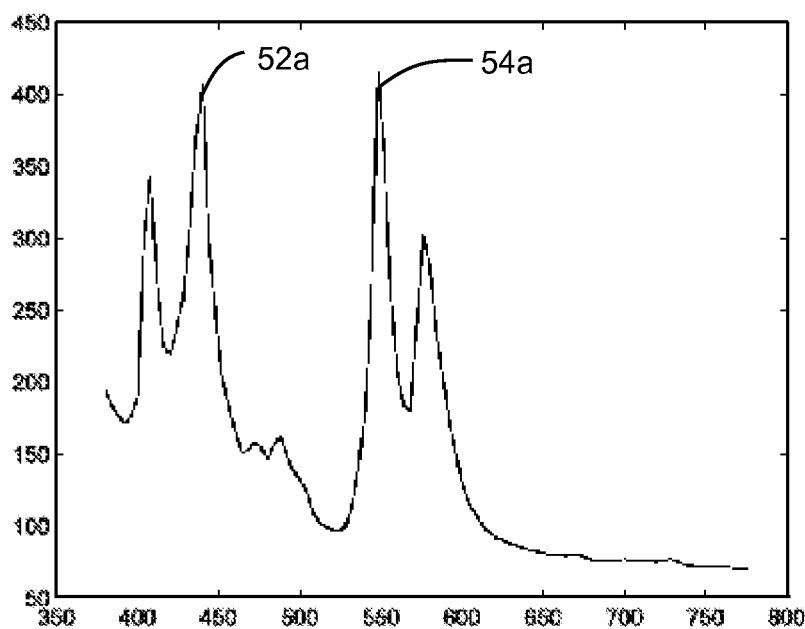
FIG. 2 is an exemplary plot of a spectrum of a projector lamp of the projector system of FIG. 1.

FIG. 2 illustrates a plot of the spectra of a typical UHP mercury lamp as measured by a spectroradiometer, and indicates that mercury lamps have a greater intensity in the green and green-yellow wavelength regions since the curve has maximum peaks 52a and 54a in the 400-450 and 550-600 nanometer ranges. It will be appreciated that other UHP mercury lamps will generally have similar spectral distributions. The spectra of the lamp 22 in the projector 20 can be determined by a variety of methods. For example, the spectra of the lamp can be determined either by direct measurement with a spectroradiometer, as shown in FIG. 2, or from information provided by the manufacturer regarding the spectral properties of the mercury lamps produced by the manufacturer, or estimated by inference that all UHP mercury lamps will have a spectra reasonably close to the spectra shown in FIG. 2.

It will be appreciated that while the characteristics of a UHP mercury lamp are described herein, other types of lamps may also be used. For example, lamps commonly used in LCD or DLP projectors are also usually manufactured to defined industry standards and can also have readily available spectral property data. Such lamps, and others known in the art, can also be used as described above.

The color filters 30 can be located on a disk 32 that can rotate in the projector 20. The disk 32 can be subtended into separate color regions for each primary color. For example, in the embodiment shown in FIG. 1, the disk is subtended into three regions 32R, 32G, and 32B, with each region containing a different pure primary color filter. It will be appreciated that color filters can include other primary colors and also more than three primary colors depending on the type of projector being used. In these cases, the disk can be subtended into three, four, or more color regions depending on the number of primary colors used in the projector system. However, for simplicity and convenience, and not by way of limitation, an RGB color disk is described herein.

The angle, θ, of the disk 32 that each of the primary color regions subtend will give a different apparent relative brightness to the primary color. The angle of the disk subtended by each pure color filter is usually not known about the color filters before the method disclosed herein is undertaken.

Since the primary radiant spectra of the projector is the product of the spectra of the lamp and the spectra of the color filters, the primary radiant spectra of the projector will remain undeterminable because the spectra of the color filters is unknown. However, the primary radiant spectra of the projector can be estimated by using a priori information known about the color filters as an approximation or estimate of the spectra of the color filters.

For example, with respect to the embodiment shown in FIG. 1, since the color filters are red 32R, green 32G, or blue 32B, it can be understood that each filter will have peak sensitivities in the red, green, or blue wavelengths of the visible spectrum, respectively. More specifically, it can be assumed that the blue filter 32B will have peak sensitivities between wavelengths of approximately 400 and 500 nanometers. Similarly, the green filter 32G will have peak sensitivities between wavelengths of approximately 500 and 600 nanometers, and the red filter 32R will have peak sensitivities between wavelengths of approximately 550 and 700 nanometers. In this way, although the exact wavelengths of peak sensitivities are not known, a reasonable set of wavelengths containing the peak sensitivity can be determined and used as an approximation or estimate of the peak for each color filter.

Other a priori information known about the color filters 30 can include limits on shapes of the color filters, limits on the stopband of each of the color filters ($C_N$), the fraction of total power outside the passband for each of the color filters ($C_P$), the measured value produced by each of the color filters combined with the lamp spectrum and the sensitivity of the multi-band camera ($C_B$), the range of transmission ($C_n$), and the like. Additional parameters can be measured by the multi-band camera 40, and together all of the a priori information and information from the multi-band camera can define constraint sets that can be used to approximate reasonable set boundaries for the spectra of the projector color filters.

Some of these constraint sets can be expressed mathematically as follows.

$$C_n = \{r: 0 \leq r(k) \leq 1\}. \quad [1]$$

Equation [1] defines the range of transmission $C_n$. Equation [2] below defines the limits on the stopband of the red filter.

$$C_{NR} = \{r: 0 \leq r(k) \leq \delta_{NR}, k \in \text{Red Stopband}\}. \quad [2]$$

This can be obtained from common specifications of the filters and can be inferred since all red filters will have a passband in the red region of the spectrum, that is from about 550 nm to 800 nm. The transmission outside of this region should be very low and can be denoted by $\delta_{NR}$ in equation [2]. Similar sets can be defined for the other primary filters. Additionally, the total filter effect may include additional IR or UV filters that are often used in projectors.

$$C_{PR} = \{r: r^T W r \leq r^T r\}. \quad [3]$$

Equation [3] defines the fraction of total power outside the passband for the red filter. The matrix W is diagonal and represents an indicator function (ones and zeros) that indicate the passband (ones) and stopband (zeros). Similar sets can be defined for the green and blue filters.

$$C_B = \{r: t_R = S^T L r\}. \quad [4]$$

Equation 4 defines the transmission of the red filter, combined with the lamp spectrum, given by the diagonal matrix L, and the sensitivity of the three bands of the camera, S, to yield the camera's recorded response to the primary, $t_R$. A similar equation can be used for the other primaries.

The sets described by equations [1]-[4] can be used to estimate the spectral properties of the color filters 30 that are otherwise unknown. This information when combined with actual performance data of the projector 20 as recorded by the multi-band camera 40 can be used to estimate the primary radiant spectra of the projector system 10.

The multi-band camera 40 can be associated with the projector 20. In one embodiment, the multi-band camera can be coupled to the same housing 26 as the projector lamp 22 and color filters 30. In one embodiment, the multi-band camera can be a 3-band camera that can have red, green and blue detecting elements (not shown) that record and process images using the three primary color bands of red, green, and blue (RGB). The multi-band camera can be positioned and oriented with respect to the projector and the projection surface 16 so as to record or capture images 14 displayed by the projector on the projection surface. For example, when the projector displays an image of a pure primary color on the projection surface, the multi-band camera can record the image of each of the pure primary colors.

Figure 3:
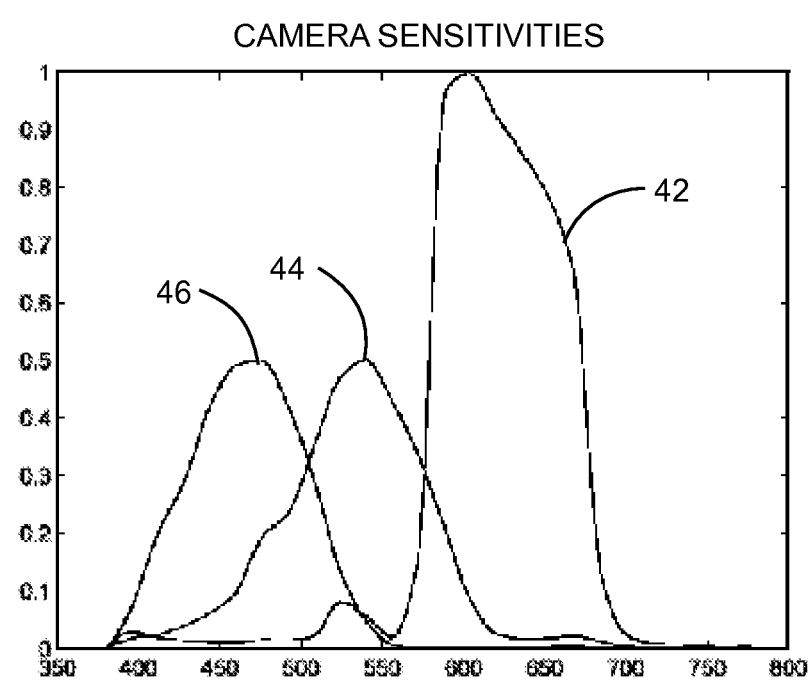
FIG. 3 is an exemplary plot of spectral sensitivities of a multi-band camera of the projector system of FIG. 1.

FIG. 3 illustrates an exemplary plot of the sensitivity of the red, green and blue detecting elements in the camera 40. In the camera modeled in FIG. 3, the sensitivity of the red detecting element is shown as the curve labeled 42, and shows a relatively smooth curve in the 500 to 700 wavelength region with a range of sensitivity between about 0 and 1. The sensitivity of the green detecting element is shown as the curve labeled 44, and shows a relatively smooth curve in the 450 to 625 wavelength region with a range of sensitivity between about 0 and 0.5. The sensitivity of the blue detecting element is shown as the curve labeled 46, and shows a relatively smooth curve in the 375 to 550 wavelength region with a range of sensitivity between about 0 and 0.5.

It will be appreciated that spectral sensitivities of the multi-band camera 40 may vary by make and model of the camera. However, spectral sensitivities of any camera used in such a system can be determined by a variety of means including by measurement of the camera's response to a known source, such as a monochromometer, or from manufacturer's data on the spectral properties of specific camera models. The spectral sensitivity data of the camera can be used by the microprocessor 60 to estimate the spectra of the color filters in the projector.

Returning to FIG. 1, the microprocessor 60 can include a solid state programmable central processing unit 62 capable of performing complex calculations and a computer memory storage media 64. The microprocessor can be programmed to receive images from the multi-band camera of the pure primary colors displayed by the projector and to analyze the images to determine the spectra of the primary color as recorded in the 3 color bands of the camera. The spectral sensitivities of the camera can be used to analyze the recorded image and produce measured spectra of the primary colors. Thus, the processor can produce a measured value of the spectra of the primary color displayed by the projector in three dimensions corresponding to the red, green and blue sensitivities of the camera.

It will be appreciated, however, that it is common to specify the spectrum of a light source, such as a lamp in a projector system in about 31 bands that range from about 400 nanometers to about 700 nanometers in wavelength with about 10 nm width. Thus, the three measured values of the spectra of the primary color displayed by the projector leave the mathematical model for solving for the 31 unknown variables of the primary radiant spectra of the projector underdetermined, and therefore unsolvable without using a priori information of the color filters in the projector.

Accordingly, the microprocessor 60 can also be programmed to estimate the primary radiant spectra of the projector system with an iterative method for solving undetermined systems using constraint sets defined by known spectra data of the lamp, known spectral sensitivities of the camera, measurements for spectra of each primary color as recorded by the multi-band camera, and a priori information about the filters.

In one embodiment, the constraint sets can be convex sets and the microprocessor 60 can be programmed to solve a Projection onto Convex Sets (POCS) iteration, as known in the art. The POCS method relies on successively projecting to a number of convex constraint sets to obtain a feasible solution. The iteration of successive projections usually converges within about 100 iterations, which takes much less than a minute on a 2 GHz desktop computer. Thus, one advantage of the embodiments described herein is the fast and inexpensive computation of transformations from a standard device-independent color space to the device-dependent control values for a display device. Other methods involve more expensive instruments, such as spectroradiometers to accomplish the same task.

In use, the POCS iteration method defines each property of the solution as a set of possible actual values for that particular property. The better the estimation and confidence in the set of possible actual values reduces the size of the set because the set values are, in fact, closer to the actual solution value. The POCS method can determine a member of the intersection of all of the various property sets. Thus, a particular spectrum in a set of spectra can be determined that satisfies all of the properties of the projector color filters 30 that are estimated from the a priori information. Consequently, by using the known spectral data of the lamp 20 and the a priori information for properties of the color filters 30, the POCS method can provide a reasonable estimate of the primary radiant spectra of the projector. The POCS solution set may not be a unique solution, but it provides at least one solution set that does satisfy all of the properties of the color filters and, hence, allows determination of the primary radiant spectra of the projector.

Figure 4:
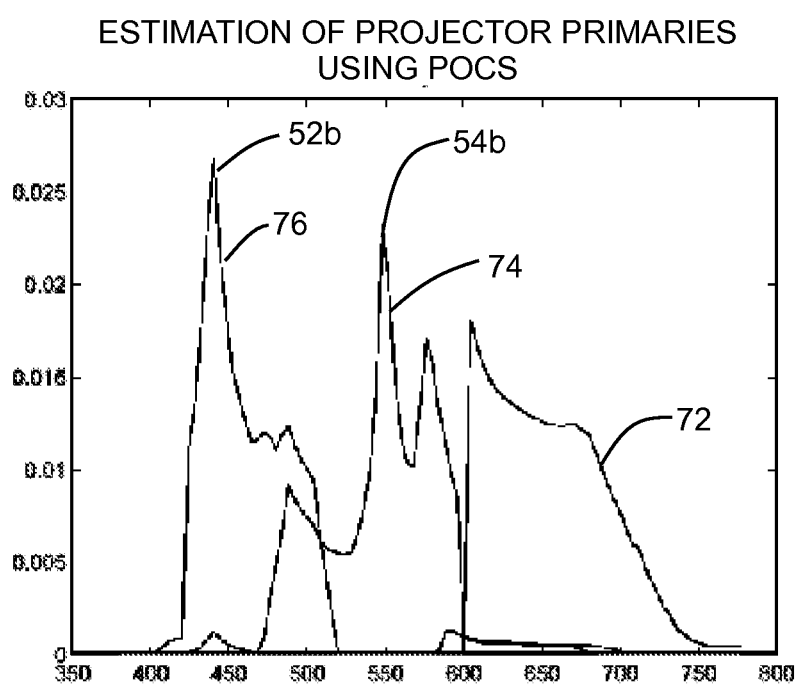
FIG. 4 is an exemplary plot of estimated primary radiant spectra of the projector system of FIG. 1.

FIG. 4 illustrates a plot of the results of the POCS iteration for the primary radiant spectra of the projector system using the spectra of the lamp 22 shown in FIG. 2, the spectral sensitivities of the multi-band camera shown in FIG. 3, and the a priori information known about the color filters in the projector. The resultant spectra of the red spectra is shown as the curve labeled 72, and shows a curve in the 600 to 750 wavelength region with a magnitude of about 0.017. The resultant spectra of the green spectra is shown as the curve labeled 74, and shows a curve in the 450 to 600 wavelength region with a magnitude of about 0.023. The resultant spectra of the blue spectra is shown as the curve labeled 76, and shows a curve in the 400 to 525 wavelength region with a magnitude of about 0.026.

Figure 5:
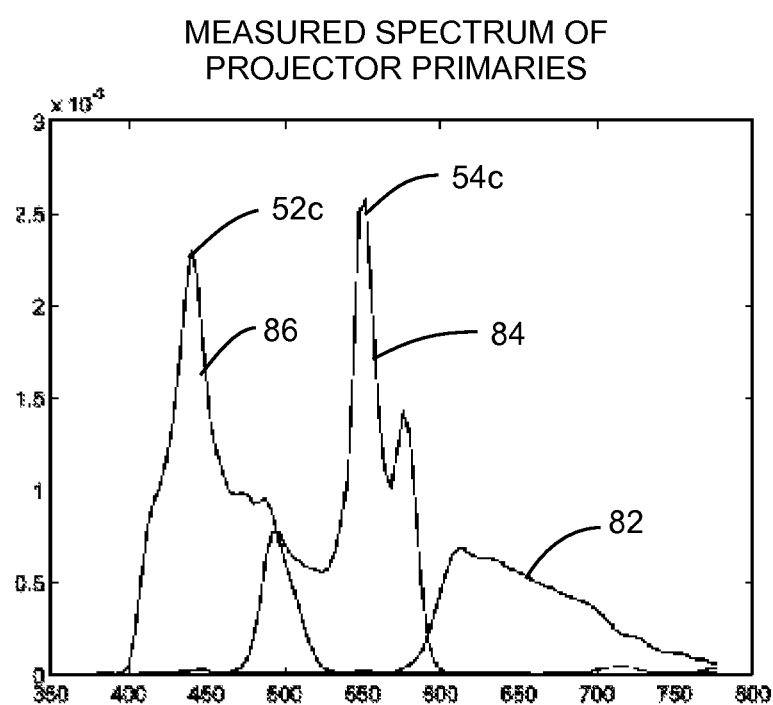
FIG. 5 is an exemplary plot of actual measured primary radiant spectra of the projector system of FIG. 1.

In contrast, FIG. 5 illustrates the actual primary radiant spectra of the projector as measured by a spectroradiometer. The actual red spectra of the projector are shown as the curve labeled 82, and have a maximum magnitude in the 550 to 750 wavelength region. The actual green spectra of the projector are shown as the curve labeled 84, and have a maximum magnitude in the 425 to 600 wavelength region. The actual blue spectra of the projector are shown as the curve labeled 86, and have a maximum magnitude in the 400 to 525 wavelength region.

As seen in FIG. 2, the spikes, shown at 52a and 54a, in the UHP mercury lamp spectra at wavelengths of about 450 and 550 nanometers are also seen in both FIG. 4 (indicated at 52b and 54b) and FIG. 5 (indicated at 52c and 54c) indicating that the POCS estimate results shown in FIG. 4 are a reasonable estimate of the actual primary radiant spectra of the projector shown in FIG. 5. Additional iterations or refining of the a priori information used for the projector color filters 30 may result in an even better estimate of the primary radiant spectra of the projector system 20.

Figure 6:
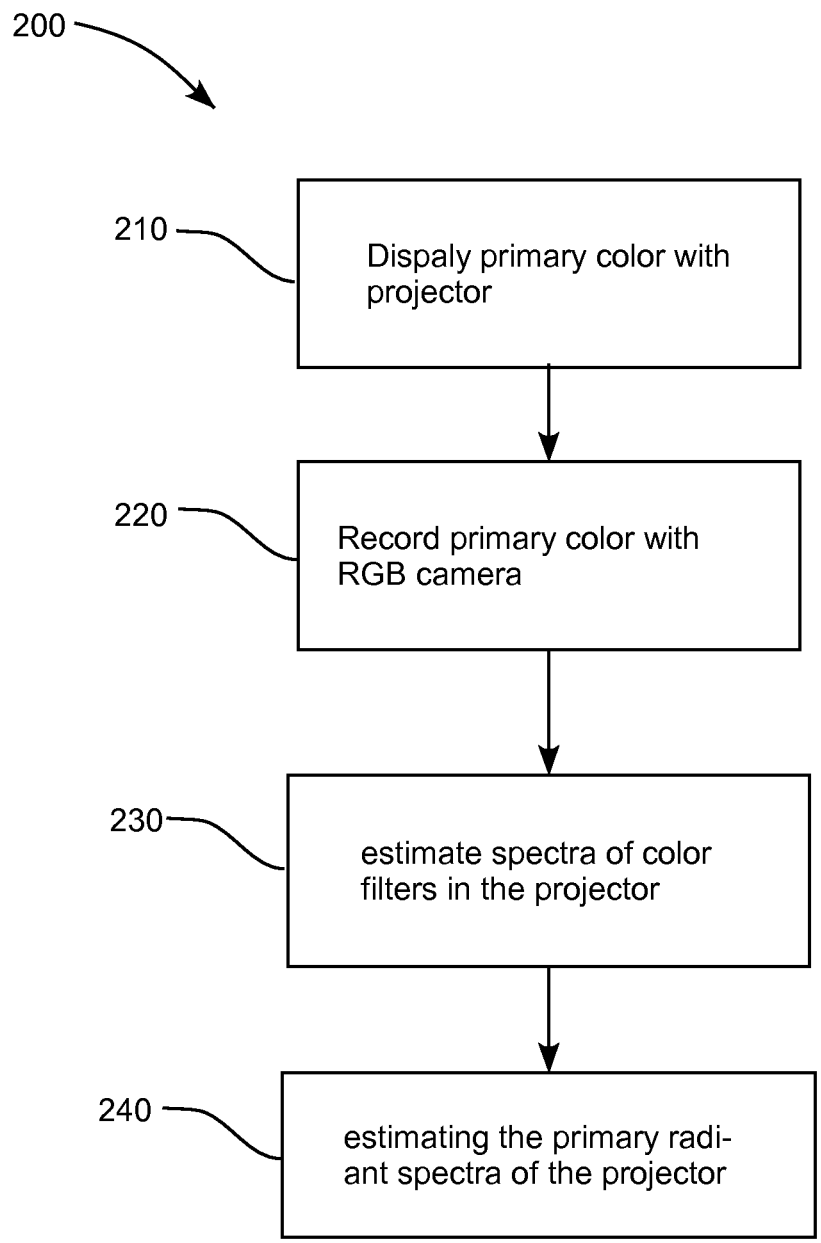
FIG. 6 is a flow chart outlining the steps in one embodiment of a method for characterizing the primary radiant spectra of a projector system using an RGB measurement.

Provided in FIG. 6 is a flow chart outlining the steps in one embodiment of a method for characterizing the primary radiant spectra of a projector system. The method, indicated generally at 200, includes directing a projector lamp and color filters in a projector to display each pure primary color, as indicated at 210. Measurements are taken of each primary color with a multi-band camera, as indicated at 220. Spectra of the color filters are estimated using the measurements from the multi-band camera, as indicated at 230. The primary radiant spectra of the projector are estimated using spectral data of the projector lamp and the estimated spectra of the color filters, as indicated at 240.

The step of taking measurements of each primary color with the multi-band camera can also include setting the multi-band camera to view light displayed by the projector onto a projection surface, such as a screen. It will be appreciated that the projection surface can reflect a certain amount of the light projected to the surface. The reflectivity of the surface onto which the light is projected is generally unknown. Omitting the effect of the projection surface and the effect of the projected image on the viewer may compromise the quality of the estimation of the primaries. Consequently, the reflectivity can be included in the primaries in order to minimize the effect on the fidelity of the estimation.

Each primary color can then be recorded with the multi-band camera. RGB spectral values of each primary color recorded by the multi-band camera can then be determined.

The step of estimating the spectra of the color filters can also include determining "a priori" information about the color filters. It will be appreciated that because the color filters in various brands of projectors are manufactured by different manufacturing processes, every brand, and in some cases each individual projector within a brand, may have color filters with different spectral properties. Moreover, the spectral properties of the color filters are not generally known or available since the projectors are designed for individual use and color calibration with other projectors is not usually performed. Therefore, in the absence of available data, the spectra of the color filters can be estimated by using a priori information known about the color filters. Such a priori information can include knowledge of the limits on shapes of the color filters, limits on the stopband of each of the color filters, the fraction of total power outside the passband for each of the color filters, the transmission of each of the color filters, the range of sensitivity, and the like.

The step of estimating the primary radiant spectra of the projector can further include using an iterative method for solving underdetermined systems with constraint sets defined by the spectral data of the projector lamp, spectral sensitivities of the multi-band camera, the multi-band camera measurements for each primary color, and the a priori information about the spectral properties of the color filters. The step of estimating the primary radiant spectra of the projector can also include determining the product of the spectra of the projector lamp and the estimated spectra of the color filters.

The constraint sets can be convex sets, and the iterative method for solving underdetermined systems can include a Projection onto Convex Sets (POCS) iteration. The POCS iteration can use the convex sets to estimate the primary radiant spectra of the projector system.

Figure 7:
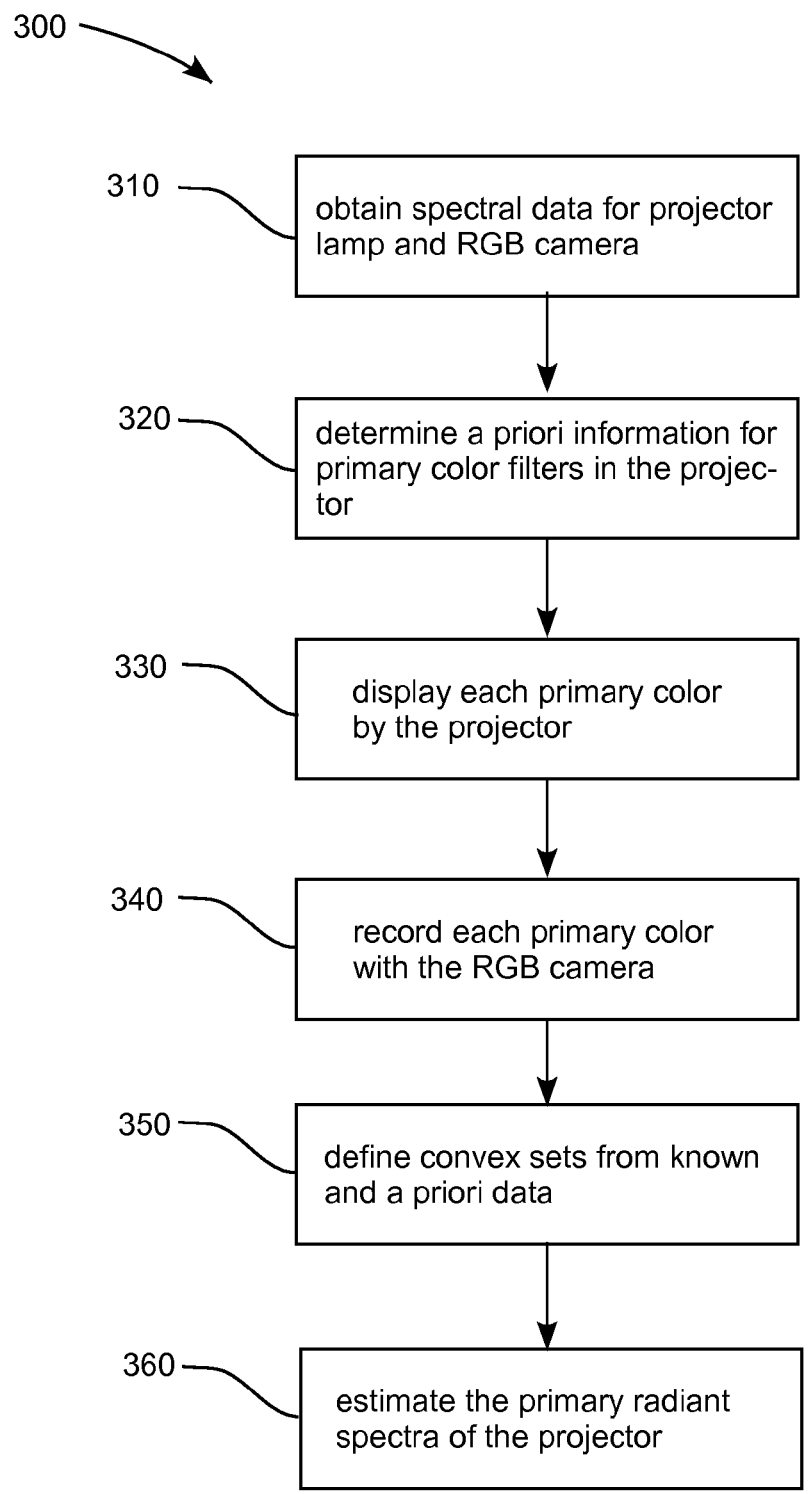
FIG. 7 is a flow chart outlining the steps in another embodiment of a method for characterizing the primary radiant spectra of a projector system using an RGB measurement.

Provided in FIG. 7 is a flow chart outlining the steps in another embodiment of a method for characterizing the primary radiant spectra of a projector system. The method, indicated generally at 300, can include obtaining available spectral data for a lamp in a projector of the projector system, and obtaining available spectral sensitivity data for a multi-band camera associated with the projector, as shown at 310. A priori information can be determined for primary color filters in the projector, as indicated at 320. Each pure primary color can be displayed by the projector at maximum brightness, as shown at 330. Each primary color can be recorded with the multi-band camera, as indicated at 340, and RGB spectra data of each primary color as recorded by the multi-band camera can be determined. Convex sets can be defined based on the available spectral data for the lamp, the available spectral sensitivity data for the multi-band camera, measured RGB spectra data for each primary color recorded by the multi-band camera, and the a priori information for the primary color filters, as indicated at 350. The primary radiant spectra of the projector can be estimated by iteration using the available spectra data of the projector lamp and the convex constraint sets, as indicated at 360. For example, the primary radiant spectra can be estimated by a Projection onto Convex Sets (POCS) iteration using the convex sets to determine a particular spectrum in a set of spectrums that satisfies all of the properties of the primary radiant spectra of the projector system.

Additionally, the a priori information for the color filters can include the limits on shapes of the color filters, limits on the stopband of each of the color filters, the fraction of total power outside the passband for each of the color filters, the transmission of each of the color filters, the range of sensitivity, and the like.

The spectral data for the lamp can be determined from a variety of sources including direct measurement by a spectroradiometer, manufacturer's data of spectral properties of lamps in a common class, bounds set by general spectral properties of mercury lamps, estimated shape of the spectrum of the projector lamp, and the like. Similarly, the spectral sensitivities of the multi-band camera can be determined from measurement of the camera's response to a known source, such as a monochromometer, manufacturer's data, and the like.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for characterizing a primary radiant spectra of a projector, comprising:
    projecting primary colors with the projector that includes a lamp and color filters;
    measuring each primary color with a multi-band camera;
    receiving a priori information about the color filters, wherein the a priori information about the color filters includes information selected from the group consisting of limits on shapes of the color filters, limits on a stopband of each of the color filters, a fraction of total power outside a passband for each of the color filters, a transmission of each of the color filters, a range of sensitivity, and combinations thereof;
    estimating a spectra of the color filters using the measurements from the multi-band camera and the a priori information about the color filters; and
    estimating the primary radiant spectra of the projector using spectral data of the projector lamp and the estimated spectra of the color filters.

2. A method for characterizing a primary radiant spectra of a projector, comprising:
    projecting primary colors with the projector that includes a lamp and color filters;
    measuring each primary color with a multi-band camera;
    estimating the primary radiant spectra of the projector using an iterative method for solving underdetermined systems with constraint sets defined by the spectral data of the projector lamp, spectral sensitivities of the multi-band camera, the measurements by the multi-band camera for each primary color, and a priori information about spectral properties of the color filters.

3. A method in accordance with claim 2, wherein the a priori information about the spectral properties of the color filters includes information selected from the group consisting of limits on shapes of the color filters, limits on a stopband of each of the color filters, a fraction of total power outside a passband for each of the color filters, a transmission of each of the color filters, a range of sensitivity, and combinations thereof.

4. A method in accordance with claim 3, wherein the constraint sets are convex sets.

5. A method in accordance with claim 2, wherein the iterative method for solving underdetermined systems includes a Projection onto Convex Sets (POCS) iteration using the constraint sets defined by the spectral data of the lamp, the spectral sensitivities of the multi-band camera, the measurements by the multi-band camera for each primary color, and the a priori information about the color filters.

6. A method for characterizing a primary radiant spectra of a projector, comprising:
    projecting primary colors with the projector that includes a lamp and color filters;
    measuring each primary color with a multi-band camera;
    determining a spectra of the projector lamp;
    determining spectral sensitivities of the multi-band camera;
    determining a priori information about the color filters, including information selected from the group consisting of limits on shapes of the color filters, limits on a stopband of each color filter, a fraction of total power outside a passband for each color filter, a transmission of each color filter, a range of sensitivity, and combinations thereof; and
    estimating the primary radiant spectra of the projector using the determined spectra of the projector lamp, the determined spectral sensitivities of the multi-band camera, the measurements by the multiband camera for each primary color, and the determined a priori information.

7. A method in accordance with claim 6, wherein the spectra of the lamp are determined from a source selected from the group consisting of direct measurement by a spectroradiometer, manufacturer's data of spectral properties of lamps in a common class, bounds set by general spectral properties of mercury lamps, estimated shape of a spectrum of the projector lamp, and combinations thereof.

8. A method in accordance with claim 6, wherein the spectral sensitivities of the multi-band camera are determined from a source selected from the group consisting of measurement of the camera's response to a known source, manufacturer's data, and combinations thereof.

9. A method for characterizing a primary radiant spectra of a projector, comprising:
    projecting primary colors with the projector that includes a lamp and color filters;
    measuring each primary color with a multi-band camera;
    estimating a spectra of the color filters using the measurements from the multi-band camera; and
    estimating the primary radiant spectra of the projector using spectral data of the projector lamp and the estimated spectra of the color filters,
    wherein measuring each primary color comprises:
        setting the multi-band camera to view light displayed by the projector;

recording each primary color with the multi-band camera; and determining multi-band spectral values of each primary color recorded by the multi-band camera.

10. A method for characterizing a primary radiant spectra of a projector, comprising:

projecting primary colors with the projector that includes a lamp and color filters;

measuring each primary color with a multi-band camera;

estimating a spectra of the color filters using the measurements from the multi-band camera; and estimating the primary radiant spectra of the projector using spectral data of the projector lamp and the estimated spectra of the color filters, wherein estimating the primary radiant spectra of the projector further includes:

determining a product of a spectra of the projector lamp and the estimated spectra of the color filters.

11. A method for characterizing a primary radiant spectra of a projector system, comprising:

obtaining spectral data for a lamp in a projector of the projector system, and spectral sensitivity data for a multi-band camera associated with the projector system;

determining a priori information of spectral properties for primary color filters in the projector;

displaying each primary color by the projector at maximum brightness;

recording each primary color with the multi-band camera;

defining convex sets based on the spectral data for the lamp, the spectral sensitivity data for the multi-band camera, measured spectral data for each primary color recorded by the multi-band camera, and the a priori information for the primary color filters; and estimating the primary radiant spectra of the projector system using the convex sets.

12. A method in accordance with claim 11, wherein estimating the primary radiant spectra includes performing a Projection onto Convex Sets (POCS) iteration using the convex sets.

13. A method in accordance with claim 11, wherein the a priori information of the spectral properties for the primary color filters includes information selected from the group consisting of limits on shapes of the color filters, limits on a stopband of each color filter, a fraction of total power outside a passband for each color filter, a transmission of each color filter, a range of sensitivity, and combinations thereof.

14. A method in accordance with claim 11, wherein the spectral data for the lamp is determined from a source selected from the group consisting of direct measurement by a spectroradiometer, manufacturer's data of spectral properties of lamps in a common class, bounds set by general spectral properties of mercury lamps, estimated shape of the spectrum of the projector lamp, and combinations thereof.

15. A method in accordance with claim 11, wherein the spectral sensitivity data for the multi-band camera is determined from a source selected from the group consisting of measurement of the camera's response to a known source, manufacturer's data, and combinations thereof.

16. A method in accordance with claim 11, wherein the recording of each primary color with the multi-band camera includes determining the spectral data of each primary color as recorded by the multi-band camera.

17. A system comprising:

a projector, having a lamp and primary color filters, to selectively project individual primary colors to a projection surface;

a multi-band camera, associated with the projector and oriented to record each of the projected primary colors;

a microprocessor in communication with the multi-band camera, configured to receive image signals from the multi-band camera, and programmed to estimate a primary radiant spectra of the projector based on the image signals, using an iterative method for solving undetermined systems, wherein the iterative method includes a Projection onto Convex Sets (POCS) iteration using convex constraint sets defined by spectral data of the lamp, spectral sensitivities of the multi-band camera, measurements for spectra of each primary color as recorded by the multi-band camera, and a priori information about spectral properties of the color filters.

18. A system in accordance with claim 17, wherein the a priori information about the spectral properties of the color filters includes information selected from the group consisting of limits on shapes of the color filters, limits on a stopband of each color filter, a fraction of total power outside a passband for each color filter, a transmission of each color filter, a range of sensitivity, and combinations thereof.

* * * * *

UNITED STATES PATENT AND TRADEMARK OFFICE
CERTIFICATE OF CORRECTION

| | | |
|---|---|---|
| PATENT NO. | : 8,675,189 B2 | Page 1 of 1 |
| APPLICATION NO. | : 12/580059 | |
| DATED | : March 18, 2014 | |
| INVENTOR(S) | : Joel Trussell | |

It is certified that error appears in the above-identified patent and that said Letters Patent is hereby corrected as shown below:

In the Claims:

In column 10, line 14, in Claim 4, delete "claim 3," and insert -- claim 2, --, therefor.

Signed and Sealed this
Fifteenth Day of July, 2014

Michelle K. Lee
*Deputy Director of the United States Patent and Trademark Office*